Aug. 3, 1954 A. E. RISTAU ET AL 2,685,447

AUTOMATIC RECORD CHANGER FOR PHONOGRAPHS

Filed Aug. 27, 1949 6 Sheets-Sheet 1

INVENTORS.
ARNOLD E. RISTAU.
ALFRED G. RISTAU.
BY
Lockwood, Goldsmith & Galt.
ATTORNEYS.

Aug. 3, 1954 A. E. RISTAU ET AL 2,685,447

AUTOMATIC RECORD CHANGER FOR PHONOGRAPHS

Filed Aug. 27, 1949 6 Sheets-Sheet 2

INVENTORS.
ARNOLD E. RISTAU.
ALFRED G. RISTAU.
BY
Lockwood, Goldsmith & Galt,
ATTORNEYS.

INVENTORS,
ARNOLD E. RISTAU.
ALFRED G. RISTAU,
BY Lockwood, Goldsmith & Galt,
ATTORNEYS.

Aug. 3, 1954 A. E. RISTAU ET AL 2,685,447

AUTOMATIC RECORD CHANGER FOR PHONOGRAPHS

Filed Aug. 27, 1949 6 Sheets-Sheet 4

INVENTORS.
ARNOLD E. RISTAU.
ALFRED G. RISTAU,
BY
Lockwood, Goldsmith & Galt.
ATTORNEYS.

Aug. 3, 1954 A. E. RISTAU ET AL 2,685,447

AUTOMATIC RECORD CHANGER FOR PHONOGRAPHS

Filed Aug. 27, 1949 6 Sheets-Sheet 5

INVENTORS.
ARNOLD E. RISTAU.
ALFRED G. RISTAU.

BY Lock, Goldsmith & Galt,
ATTORNEYS.

Aug. 3, 1954 A. E. RISTAU ET AL 2,685,447

AUTOMATIC RECORD CHANGER FOR PHONOGRAPHS

Filed Aug. 27, 1949 6 Sheets-Sheet 6

INVENTORS.
ARNOLD E. RISTAU.
ALFRED G. RISTAU,
BY Lockwood, Goldsmith & Galt,
ATTORNEYS.

Patented Aug. 3, 1954 2,685,447

UNITED STATES PATENT OFFICE 2,685,447

AUTOMATIC RECORD CHANGER FOR PHONOGRAPHS

Arnold E. Ristau and Alfred G. Ristau, Kaukauna, Wis., assignors to Ristaucrat, Inc., Kaukauna, Wis.

Application August 27, 1949, Serial No. 112,738

5 Claims. (Cl. 274—10)

This application relates to an automatic record changer for phonographs of the drop type wherein a stack of records are supported above and axially of the turntable with means to release the lowermost record for permitting it to drop into playing position on the turntable.

One feature of the invention resides in the provision of a mechanism for raising the group of played records from the turntable for replacement on the support after all records have been dropped therefrom and the reproduction of the uppermost record on the turntable completed, thus producing a continuous play changer, reference being had to our application Serial No. 688,064, filed August 2, 1946, entitled "Automatic Record Changing Phonograph."

A feature of said continuous play mechanism resides in the feeler element for controlling the stack resetting mechanism, said feeler being free of record engagement during the playing cycle, but engageable with the peripheral edge of one or more records supported above the turntable during the record changing cycle. Said feeler is rendered operative to cause the stack to be lifted from the turntable for replacement on the support when no record remains on the support with which it may engage during said changing cycle.

Another feature of the invention resides in mechanism for holding the records in the magazine supported above the turntable stationary during rotation of the turntable, wherein said records are wholly supported by elements engaging their center openings carried by a fixed support above and centrally of the turntable.

Another feature of the invention resides in the selective dial operably connected with the record changing mechanism adapted to be pre-set for the playing of any desired number of records, and operative to offset continuous play or automatically discontinue further operation of the mechanism and playing of the records after the indicated number of records have been reproduced.

Another feature of the invention resides in the mechanical trip mechanism operative to effect the record changing upon movement of the reproducer to a predetermined position at the end of the recording grooves.

A further feature of the invention resides in mechanism for providing a kickoff release of meshing driving gears for actuating the record changing mechanism, thereby serving in place of and eliminating the usual clutch.

Another feature of the invention resides in the provision of a stationary upwardly-extending brush over and through which the reproducer needle passes in moving from non-playing to playing position on a record for removing any accumulation of dust or foreign matter therefrom.

The full nature of the invention will be understood from the accompanying drawings and the following description and claims:

Figure 1:
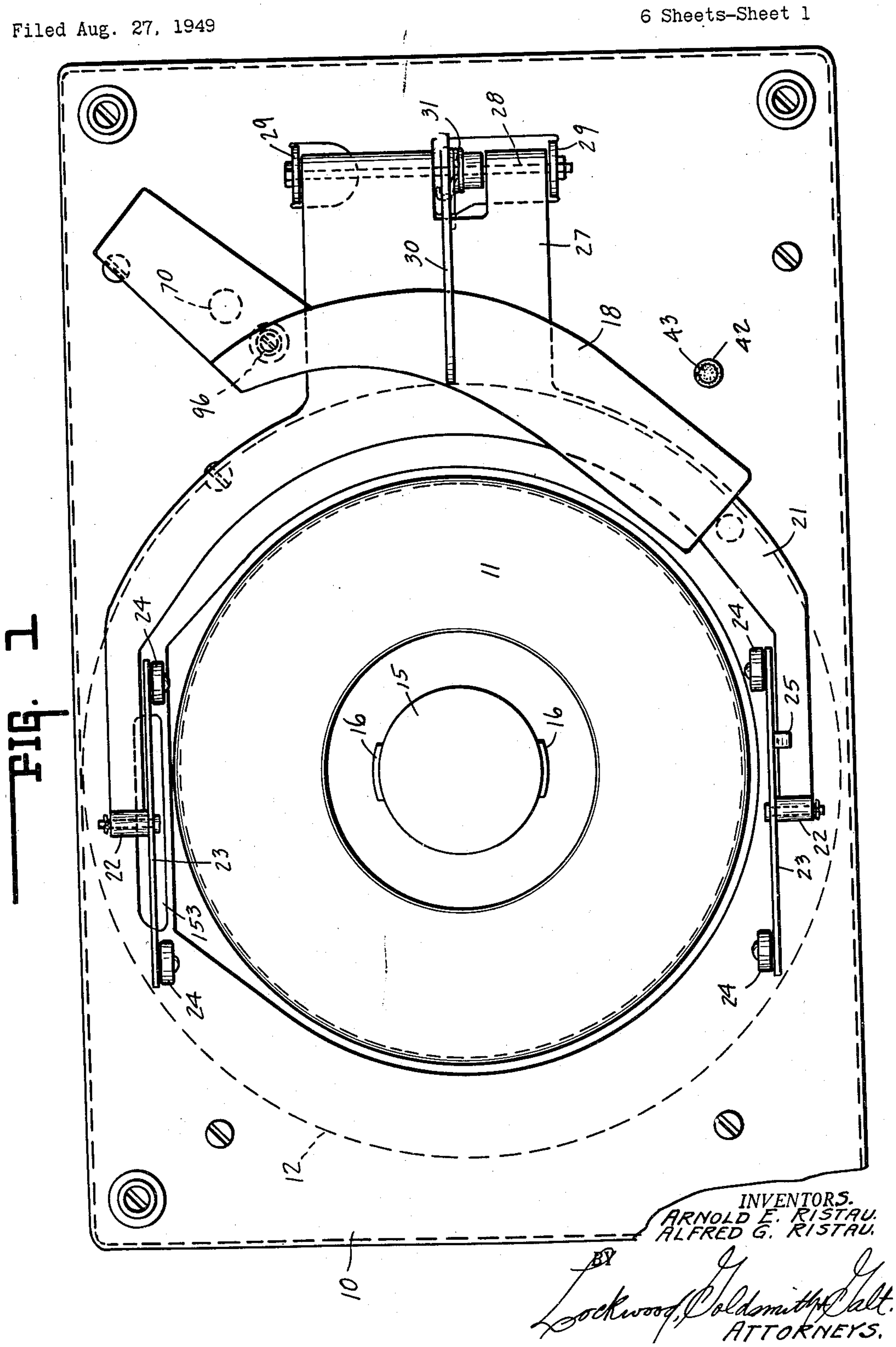
Fig. 1 is a plan view of the record changer with the records removed and the tone arm in position to play.

In the drawings there is shown a record changer for phonographs having a supporting bed plate 10 centrally apertured to receive a rotating turntable 11 for playing a record 12 having an enlarged central aperture 13 through which the turntable centering and guiding column 14 extends, said column being carried by and rotatable with the turntable. Mounted above said column and flush therewith there is a stationary record supporting head 15 having retractible record supporting fingers 16 extending radially therefrom, normally effective to support a stack of records 12a above the turntable.

Operative immediately above each of the fingers 16 there is a record separating knife 17 movable between the lowermost and superimposed record to support the remainder of the stack upon the fingers 16 being retracted to permit the separated lowermost record to drop into playing position on the turntable. In timed relation with the dropping of the record from the stack to the turntable the tone arm 18 carrying the reproducer 19 and groove-engaging needle 20, is caused to be elevated and swung laterally beyond the peripheral edges of the records to permit them to drop into playing position or be returned to stack supporting position free of interference.

Partially surrounding the turntable 11 and extending below the peripheral portion of the lowermost record supported thereon, there is a record resetting yoke 21. On the opposed free ends of said yoke there is pivoted at 22 a pair of record engaging arms 23 carrying a rubber contact button 24 at each end thereof. To limit the movement of the respective arms 23 about their pivotal mountings 22, each of said arms is provided with an upper lip 25 and lower lip 26 in spaced relation from each other for engaging the upper and lower sides of the yoke 21, respectively. The arms 23 are so balanced on the yoke that as the yoke is swung upwardly, said arms will raise the records and maintain their parallel relation to the turntable. The yoke 21 is carried by an extension 27 pivoted at 28 between a pair of supporting ears 29 carried by the bed plate 10. In the manner hereinafter described, the resetting yoke is caused to raise and reset the records through the action of a feeler 30 which normally move into contact with the peripheral edge of the records in the stack 12*a* under tension of a spring 31, said feeler being pivotally mounted at 28 and having a downwardly-extending arm 32.

The turntable is driven by a motor 33 having an upstanding shaft 34 which frictionally engages and drives a composition disk 35 which in turn frictionally drives the turntable through engagement with its depending flange 36 by a friction wheel 37. Secured to the bed plate 10 there is a mounting plate 38 for supporting the motor 33 and other mechanism as hereinafter described. The friction wheel 37 is held in frictional engagement under tension of a spring 39 having one end secured to the mounting plate and the other end secured to a bearing plate 40.

For cleansing the reproducing needle 20 of dust so that there will be no interference with the fidelity of the reproduction upon its engaging a record groove, the bed plate 10 carries a stud 41 over which there is telescoped an upstanding rubber or similar yielding sleeve 42 carrying an upstanding brush 43. The brush 43 is located in the path of movement of the reproducer so that the needle 20 will be caused to brush lightly through the bristles thereof in its movement to and from record engagement.

On the underside of the turntable and spaced therebelow there is a gear 44 rotatable therewith, said gear meshing with a gear 45 having its bearing in the mounting plate 38. Extending downwardly from the gear 45 there is a spindle 46 bearing a spur gear 47 which meshes with and drives a gear 48 having secured thereon a pinion 49 which engages and meshes with a gear 50. During the reproduction of a record this chain of gears is caused to idle. Said gears are carried on a swivel plate 51 pivoted for oscillation about the lower end of the spindle 46, being limited in its movement by the limitations imposed through the medium of an elongated slot 52 thereinto which a fixed pin 53 extends from a sub-plate 54. Upon said swivel plate moving to the left the gear 50 is moved into meshing engagement with a gear 55 which drives the mechanism to elevate the tone arm, swing it clear of the peripheral edge of the records, actuate the record releasing mechanism and return the tone arm to playing position. After the tone arm is returned to playing position the swivel plate is caused to move to neutral position, as shown in Fig. 5.

Figures 5, 8, 9:
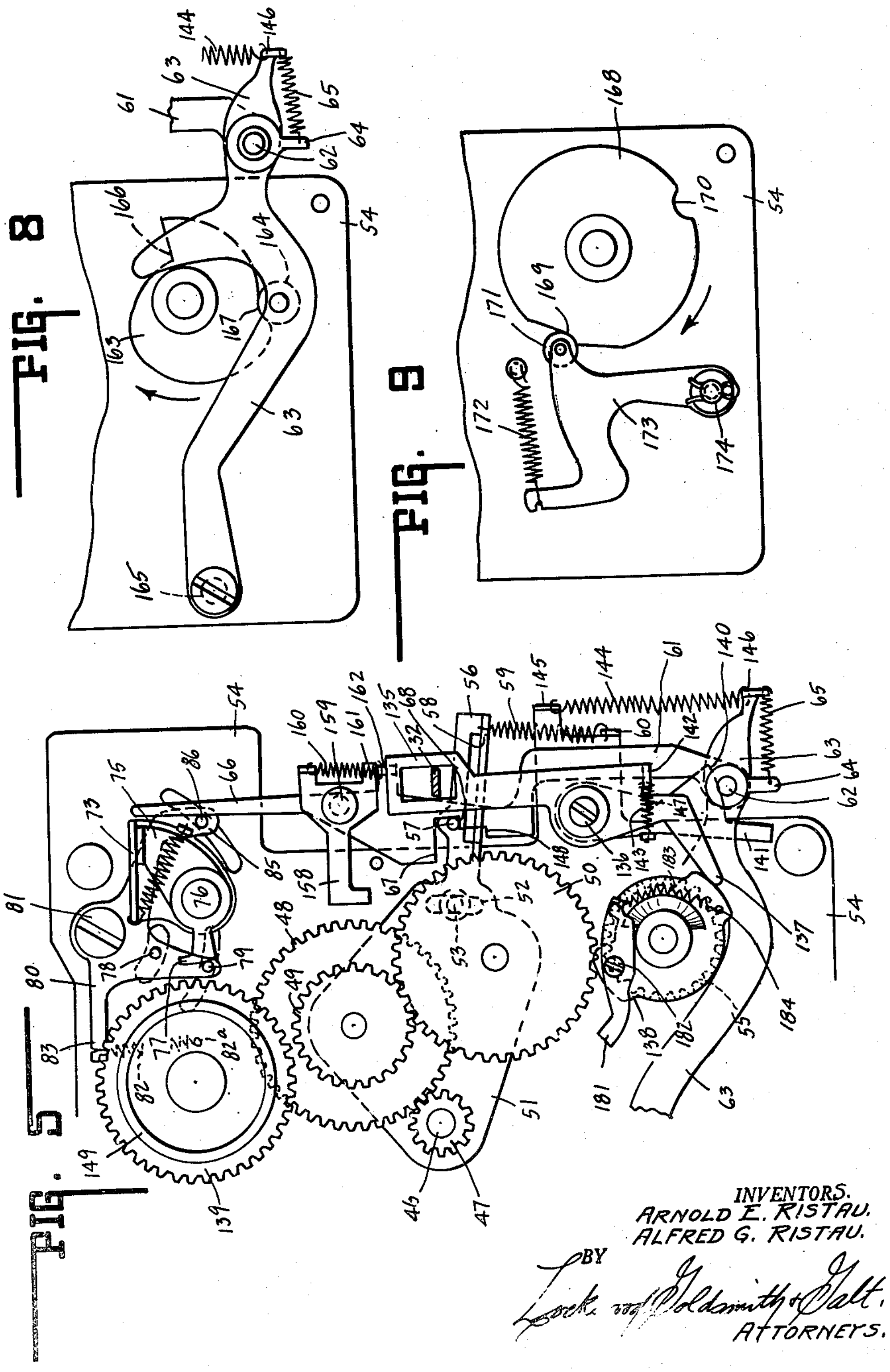
Fig. 5 is a plan view showing the record changing and elevating mechanism in record playing position, with parts removed.
Fig. 8 is a plan view of the cam and kick-out lever for demeshing the record changing driving gears.
Fig. 9 is a plan view of the cam and lever operative to free the meshing teeth of the record changing gears.
Figure 6:
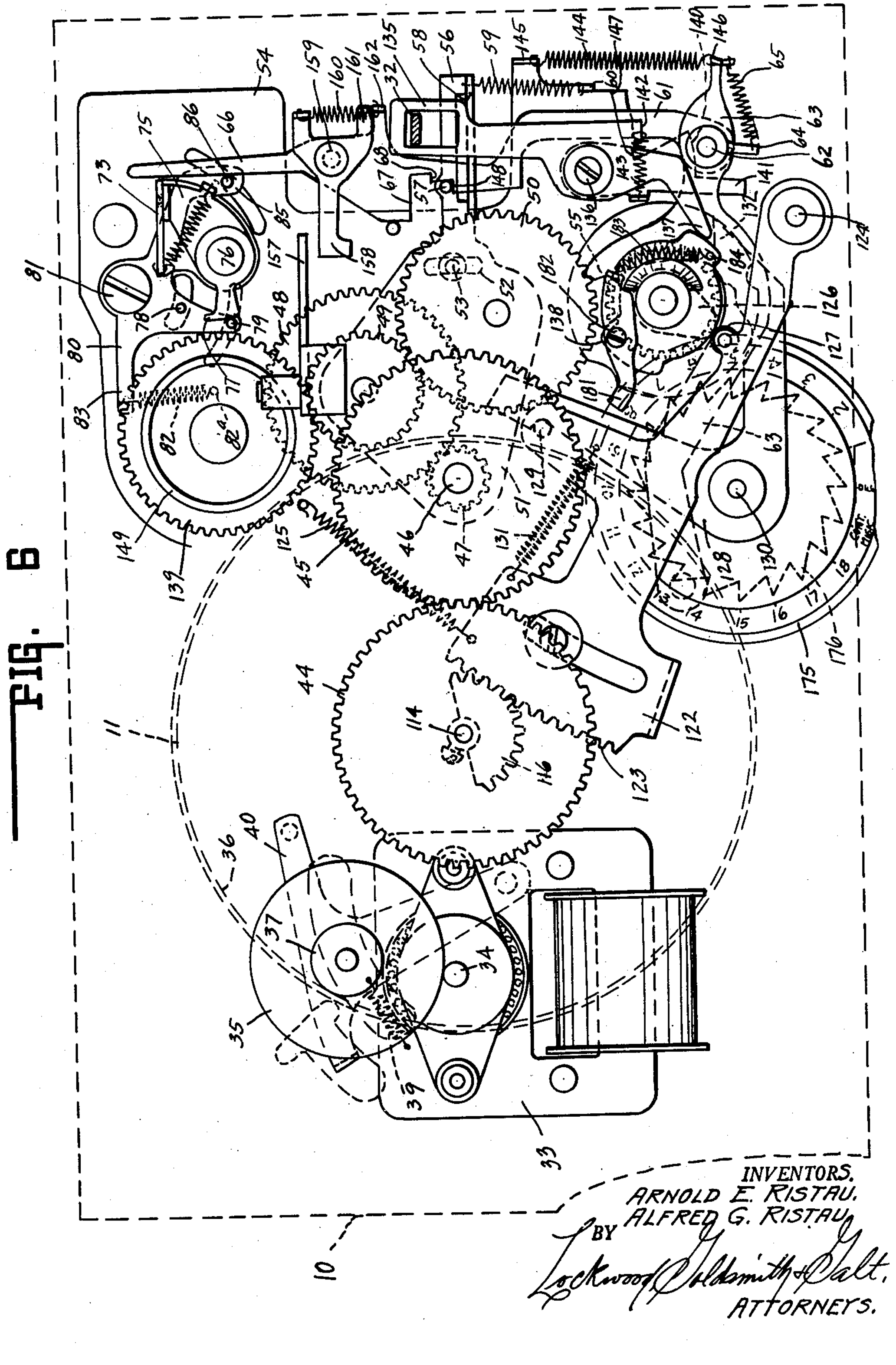
Fig. 6 is a plan view of the turntable drive and record changing mechanism in record changing position with parts removed.

For moving the swivel plate to the left, as shown in Figs. 5 and 6, it is provided with an extension 56 having an upwardly extending pin 57 and an elongated slot 58. It is biased to the left by a tension spring 59 connecting its extension 56 with a projection 60 on the sub-plate 54. A shift lever 61 is pivotally connected at 62 to an arm 63 having a projection 64 for anchoring one end of the tension spring 65, the other end thereof being connected with said arm 63. Said shift lever 61 is formed with a gooseneck extension terminating in a finger 66 which passes through the slot 58 of the extension 56. It is formed with an inwardly extending portion providing a shoulder 67 engageable with the pin 57 of said extension 56 and an opposed shoulder 68 engageable with the opposed side of said pin so that said pin rides freely therebetween. When said shift lever is in normal position it holds the swivel plate in its neutral position through the medium of the shoulder 68 engaging pin 57. When the extension 66 of said shift lever is moved outwardly, shoulder 68 releases pin 57 and spring 59 oscillates the swivel plate to move gear 50 into mesh with gear 55. This action occurs upon completion of a record through the trip mechanism actuated by the tone arm.

When the tone arm moves inwardly a predetermined distance, it rotates its supporting rod 70 to which it is pinned at 71. Said supporting rod is connected with a swivel plate 72 having a depending bracket 73 which carries an upper arm 74 and a lower plate 75, both of which oscillate about a stationary bearing post 76 mounted on the sub-plate 54 and extending upwardly therefrom in alignment with the supporting rod 70. The lower plate 75 has an outwardly extending toe 77 movable between the pins 78 and 79 and extending upwardly from the trip lever 80 which swivels about a pivot 81 on the sub-plate. Said trip lever is biased in one direction by a tension spring 82 connected with an arm 83 thereon at one end and with a pin 82*a* on sub-plate 54 at the other end. Opposite the arm 83 said trip lever is provided with an arm 85 which carries a pin 86 movable to contact the extension 66 of the shift lever 61.

Upon the tone arm swinging to a predetermined inward position at the completion of a reproduction, the toe 77 is moved out of engagement with pin 79 and into engagement with pin 78 on the trip lever, causing spring 82 to move it in a direction to cause its pin 86 to engage the extension 66 on the shift lever and free its shoulder 68 from pin 57 on extension 56 of the swivel plate. Spring 59 thereupon draws the gear 50 into mesh with gear 55 which initiates the record changing cycle.

Figures 3, 7:
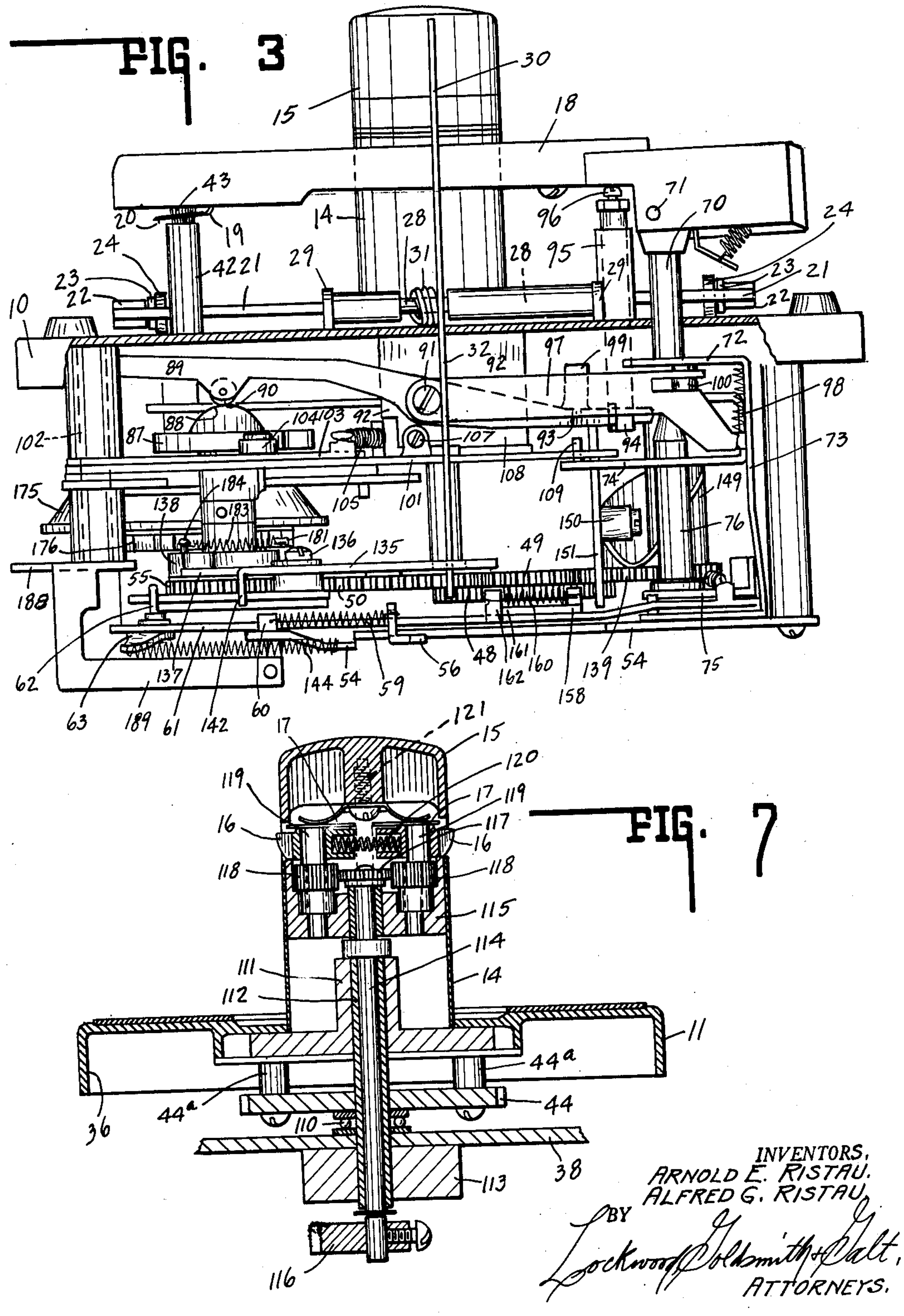
Fig. 3 is a side elevation of the phonograph showing the record changing and elevating actuating mechanism with parts thereof in section.
Fig. 7 is a central vertical section through the turntable, centering column and record support, and releasing mechanism.

Rotatable with the gear 55 there is a cam 87, see Fig. 3, carrying a peripheral camming edge surface and an upwardly extending camming surface 88. Camming surface 88 engages a lever 89 having a cam follower 90, said lever being pivotally supported at 91 on a bracket 92. The opposite end thereof is curved inwardly at 93 to engage in a bifurcated rod 94 extending upwardly and through a bearing sleeve 95 terminating in an adjustable tone arm lifting head 96. Thus, as the follower 90 rides down the camming surface 88, the opposite end serves to elevate the tone arm free of the record. Upon the follower riding up the cam the tone arm is lowered into playing position, being in the position shown in Fig. 3 during the reproducing cycle. Also pivotally mounted at 91 there is provided an arm 97 which is biased upwardly by a spring 98 against a lug 99 carried on the lever 89. Said arm 97 carries a brake shoe 100 which engages the swivel plate 72 and frictionally resists movement thereof during the record changing cycle. But during the playing cycle the lug 99 forces arm 97 downwardly to disengage the brake shoe, whereupon the tone arm may freely move with the grooves of the record during the playing cycle.

For swinging the tone arm outwardly and inwardly relative to the records, there is an arm 101 pivoted at one end by a supporting rod 102 extending from the bed plate 10 to the sub-plate 54. This arm 101 carries a follower plate 103 having a follower 104 engageable with the peripheral cam surface of cam 87, said follower being biased into cam engagement by a tension spring 105 having one end connected thereto and the other end connected to a pin on the arm 101. Said pin is also biased by a tension spring 106 in the direction to draw said arm into cam follower engagement. The follower plate 103 and the arm 101 are adjustable relative to each other to control the swinging movement of the tone arm. However, the inward position to which the tone arm is swung is controlled by an adjustable stop screw 107 which is engageable with a depending bracket 108 carrying the pivot 91. The free end of the arm 101 is provided with an enlarged aperture through which a pin 109 extends carried by the upper arm 74 of the tone arm bracket 73. The enlarged aperture is such as to permit free movement of the reproducer from the beginning to the end of the playing grooves. Thus, upon the gear 50 meshing with the gear 55 to rotate the cam 87, as the tone arm is elevated the free end of the arm 101 engages pin 109 to swing it free of the records when moved by the cam in the outward direction. Continued rotation of the cam then permits the spring 106 to draw arm 101 inwardly, engaging pin 109 from the opposite side and moving the tone arm to its proper position above the beginning of the record, whereupon it is lowered into record engagement by action of the cam surface 88.

Figure 2:
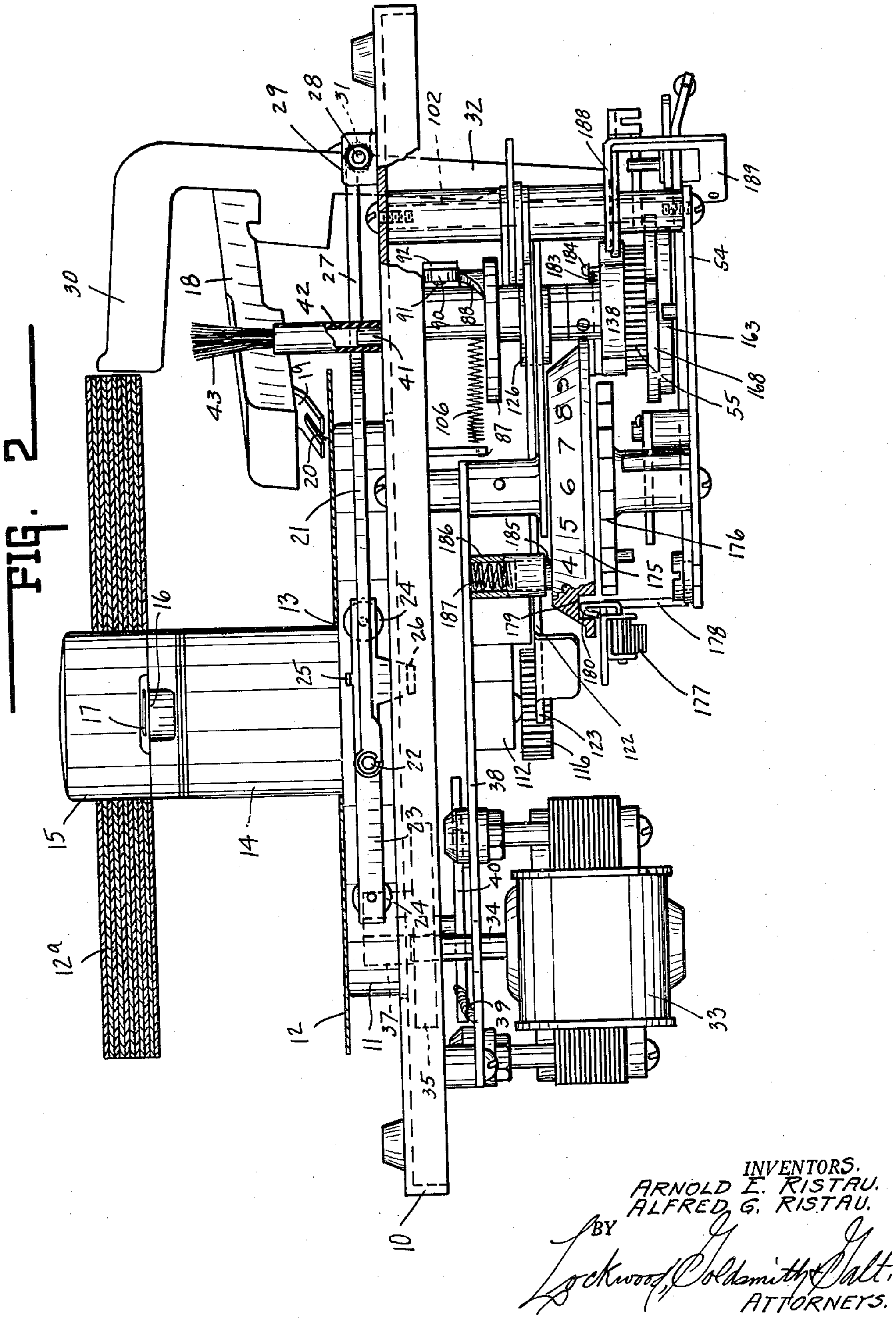
Fig. 2 is a front elevation thereof with the records in place and the tone arm in playing position, with parts broken away.

As shown in Fig. 2, the magazine of records 12*a* is supported above the turntable by the fingers 16. Upon the tripping mechanism above described coming into operation and the reproducer having been moved clear of the periphery of the records, the supporting fingers 16 are retracted inwardly of the head 15 as the separating knives 17 swing into record separation and supporting relation to the superimposed records, whereby the lowermost record is permitted to drop onto the turntable. The following mechanism actuates the fingers and knives in timed relation for this purpose.

The turntable 11 and record supporting unit are carried by the mounting plate 38. The turntable includes the gear 44 which is secured to the underside thereof by the spacers 44*a* to rotate therewith and serve as a rotatable support therefor. The supporting and rotating gear is carried by ball thrust bearing 110 on the mounting plate 38. Within the turntable 11 and its centering post 14, which is hollow, there is an upstanding bearing member 111 rotatable about a fixed tube 112 which extends from a supporting clamp 113 secured to the underside of the mounting plate 38. Extending upwardly through the tube 112 there is an oscillating shaft 114 which extends downwardly through the mounting plate 38 and clamp 113. It has secured thereto a segmental gear 116 for oscillating said shaft. On the upper end of said shaft there is provided a gear 117 meshing with a pair of opposed pinions 118 having their bearing in the bearing block 115. Each of said pinions is provided with an upwardly extending eccentric stud 119 which carries the supporting fingers 16 slidably mounted on the bearing block 115. Intermediate the fingers 16 there is a compression spring 120 urging them in their extended position but permitting their retraction when the pinions 118 are oscillated. Each of the studs 119 carries one of the separating knives 17 which oscillates with the eccentric stud to swing outwardly to record separating position as the fingers 16 are retracted. The head 15 is secured to the bearing block 115 by a pair of clamping screws 121 on each side of the tube 113.

The following described mechanism engages and oscillates the segmental gear 116 for causing the lowermost record in the magazine to drop. For this purpose there is provided a lever 122, see Fig. 6 having a toothed quadrant 123 meshing with the segmental gear 116. Said lever 122 is biased to swing in one direction about a pivot 124 by a spring 125. It is swung in the opposite direction by a cam 126 engaging a follower 127 on said lever, said cam 126 rotating with the gear 55 and the associated cams 87 and 88. Said lever is normally held during the reproducing cycle in the position shown in Fig. 5 by a bell crank lever 128 against the tension of spring 125 through engagement of a pin 129 on lever 122 with the shoulder provided on the bell crank lever. The bell crank lever is fulcrumed at 130 and is biased in its latching position by a tension spring 131. At the opposite end of the bell crank lever there is an inwardly extending tongue 132 engageable by the cam 126.

Upon operation of the trip mechanism, when the gear 50 is thrown into mesh with the gear 55 in the manner hereinbefore described, cam 126 will rotate until it first engages tongue 132 of the bell crank lever, swinging said lever to its unlatching position with respect to the pin 129 on the lever 122. Spring 125 will thereupon cause the quadrant 123 to rotate the segmental gear 116 to rapidly rotate the separating knives into their stack engaging position and retract the supporting fingers 16, dropping a record into playing position on the turntable. Upon continued rotation of the cam 126 it will engage the follower 127 of lever 122, returning said lever to its initial position against the tension of spring 125 to be again latched by the bell crank lever with the separating knives retracted and the supporting ears 16 extended into normal stack supporting position.

The resetting yoke 21 controlled by the feeler 30 to return the played records to the magazine position after the last record is dropped therefrom, is actuated by the following mechanism. The depending extension 32 of the feeler 30 has its lower end extending through an opening in a lever 135 fulcrumed at 136 on the sub-plate 54. Said lever is provided with a toe 137 extending into engageable position with a cam 138 which rotates with gear 55. The cam 138 holds the feeler slightly disengaged from and out of contact with the edges of the records in the magazine 12*a* under tension of the spring 31. However, during the record changing cycle due to rotation of gear 55, the toe 137 leaves the projection on cam 138, permitting the feeler to move inwardly to engage and be arrested by the peripheral edge of said records. When so arrested by the records, the feeler prevents operation of the resetting yoke, but if all the records have been dropped the extreme inward movement of the feeler will initiate operation thereof. This is accomplished by permitting the swivel plate 51 carrying the gear chain to swing to the right, see Fig. 5, causing gear 49 to engage and drive gear 139.

The driving engagement between gears 49 and 139 is effected by disengagement of the pin 62 on shift lever 61 from an arcuate shoulder 140 upon its arm 141 being permitted to swing inwardly toward gear 55 when the toe 137 of lever 135 is moved inwardly. This occurs when it disengages cam 138 and the feeler, through its extension 32, permits such movement. Thereupon cam 138 permits toe 137 to move inwardly, carrying with it the arm 141 to a position free of engagement with pin 62, arm 141 being engaged by projection 142 under tension of spring 143. When this occurs a tension spring 144, having one end connected with the sub-plate 54 at 145 and the other end connected with the arm 63 at 146, which moves shift lever 61 to the right until pin 62 engages a shoulder 147 on arm 141. This movement is such as to swing the swivel plate to the right, causing gears 49 and 139 to mesh. An offset shoulder 148 on the shift lever engages pin 57 to effect this movement.

Figure 4:
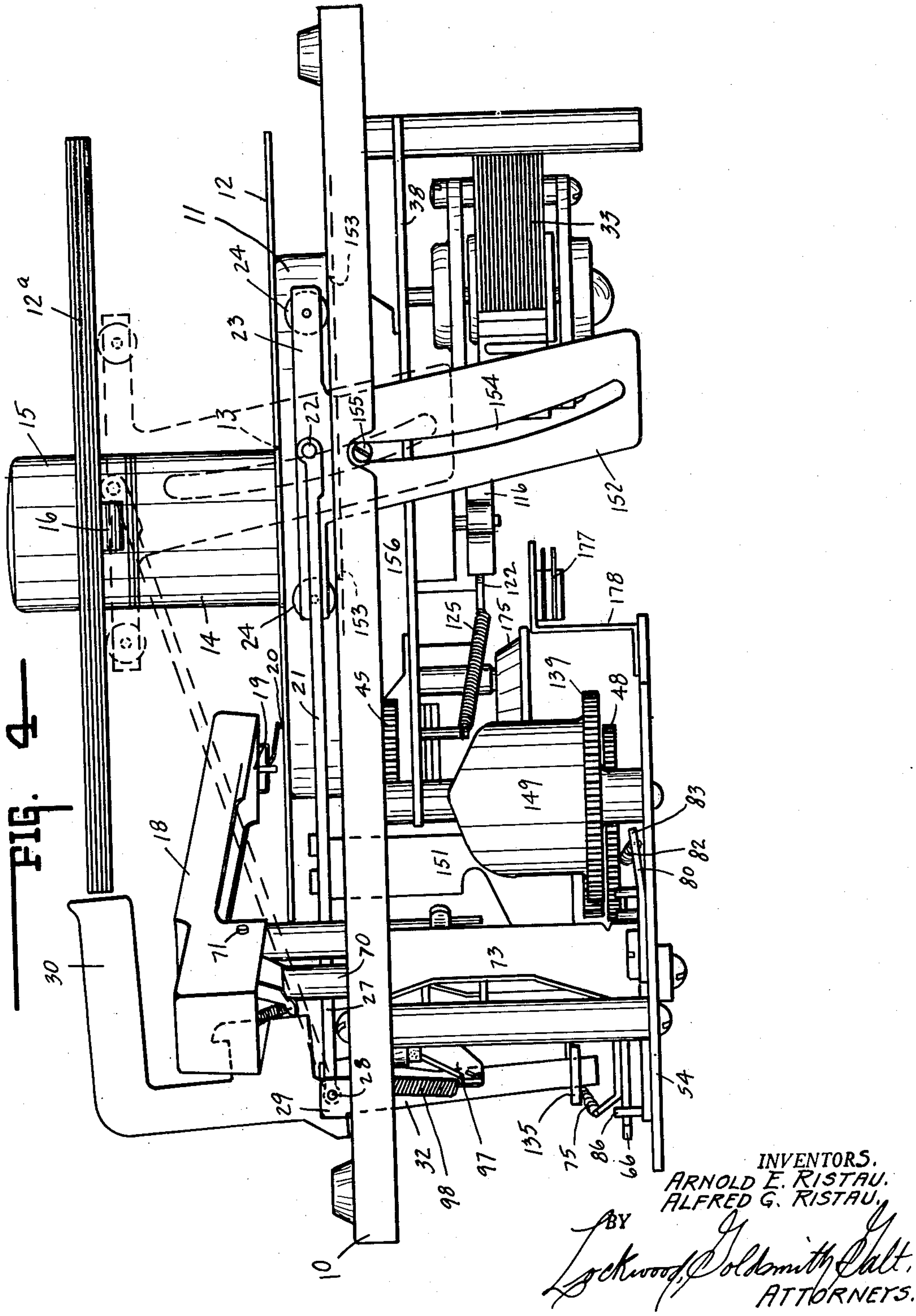
Fig. 4 is a rear elevation of the phonograph showing the records thereon and the tone arm in playing position.

Rotation of gear 139 drives a cam 149 upon which a follower 150 rides (Figs. 3, 4 and 6). The follower 150 is on a downwardly-extending lifting arm 151, secured to one arm of the resetting yoke 21. As the gear 139 and cam 149 rotate, they elevate the arm 151 and swing the resetting yoke upwardly to elevate and reset the records. For steadying the yoke in this action, the said arm thereof is provided with a downwardly extending plate 152 which slides through a slot 153 in the bed plate 10. It is provided with an arcuate slot 154 embracing a guide pin 155 extending from an apron 156 on the bed plate.

At the lower end of the lifting arm 151 there is a rearwardly and downwardly extending tail portion thereof 157 which serves to reset the shift lever after completion of a cycle through end to end abutting engagement with a reset finger 158. Said finger is fulcrumed at 159 on the shift lever, being biased by a spring 160 in the position shown in Fig. 6 with an ear 161 thereof in engagement with an ear 162 on the shift lever. As the shift lever is drawn to the right by the spring 144 upon being tripped, it carries the reset finger 158 into engagement with the tail portion 157 of the lifting arm 151. When said lifting arm is elevated, said finger then moves to a position to be engaged thereby when lowered, which action will push the finger outwardly, swinging the shift lever outwardly for releasing it from engagement with pin 57 on the swivel plate. Thereupon the swivel plate is drawn by spring 59 in the opposite direction to disengage gears 149 and 39, and again effect engagement of gears 50 and 55 to complete the record changing cycle after the records have been elevated and reset in the magazine 12*a*.

Upon completion of the record changing cycle it is desirable that the gear 50 instantaneously disengage gear 55, and that there be no drag or overrun. For that purpose there is provided a gear kickout mechanism controlled by a cam 163 which rotates with gear 55 and upon which rides a cam follower pin 164 carried by a lever 63 which is pivoted to the sub-plate 54 at 165. Cam 163 has an enlarged notched portion 166 in which the pin 164 rides to permit sufficient inward movement thereof to allow the shift lever to move its maximum distance to engage the record resetting gears 49, 139. A reduced notch 167 is provided in said cam to receive pin 164 upon completion of the record changing cycle to permit spring 144 to jerk the shift lever in the direction to swing the swivel plate to its neutral position and thereby effect instantaneous disengagement of said gears to complete and terminate the record changing cycle.

The purpose of this action is to eliminate the necessity of providing the usual clutch. To free the meshing teeth and release the power of the driving gear 50 with the driven gear 55 to readily permit their "kick-out" disengagement, a driving cam 168 is mounted above cam 163 to rotate with gear 55. Said cam is provided with oppositely disposed notches 169 and 170 into which a cam follower 171 is caused to engage under tension of a spring 172. Said cam follower is mounted on a lever 173 pivoted to the sub-plate 54 at 174.

The direction of movement of the cam follower 171 relative to the radius of the cam is such that the cam is accelerated by the push of the follower in direction of rotation upon its engagement with the lip of the recess. This reverses the driving action, gear 55 thereupon tending to drive gear 50. The meshing teeth are thus freed to readily permit the "kick-off" action of cam 163.

Means is provided for predetermining the number of records to be played, and to also serve as an on and off switch for starting and stopping the operation. For this purpose there is a numbered dial 175 rotatably supported between the bed plate 10 and the sub-plate 54. Said dial has an annular series of ratchet teeth 176 on its underside, one for each number or record to be played. Adjacent the dial there is provided a spring contact control switch 177 carried by a bracket 178. At the "off" position on the dial it is recessed at 179 to receive a spring arm 180 mounted on a spring contact switch so that when said spring arm extends into the notch, the spring contacts are separated, discontinuing operation of the machine. When the dial is turned one or more plays, the spring arm is forced out of the notch, moving the spring contacts into engagement for closing the circuit. On the far side adjacent the notch 179 the dial is relieved of a ratchet tooth so that when the dial is turned to this position the record changing operation will not affect the position of the dial, permitting indefinite continuous play until the dial is manually turned.

The dial, upon being set to a predetermined number of plays, with the spring arm 179 free of the notch and causing the circuit to be closed, will be stepped back one tooth upon completion of each record changing cycle. For this purpose the record changing gear 55 is provided with a tooth-engaging pawl 181 which is fulcrumed at 182 on the cam 138, said pawl being biased in actuating position by a tension spring 183 connected with a pin 184 on said cam. Upon each revolution of said gear 55 and cam 138 which effects a record changing operation, said pawl engages one of the ratchet teeth 176 and rotates the dial one digit toward its circuit breaking, "off" position. To restrain movement of the dial, its upper surface is frictionally engaged by a brake shoe 185 in the tubular housing 186 depending from the mounting plate 38. The shoe is held under tension by the spring 187.

A manual trip device is provided that comprises a hand operated lever 188 mounted to oscillate about rod 102. It is provided with a laterally extending arm 189 having an upstanding projection at the end thereof for lateral engagement with the shift lever 61 and operative to release said lever from its engagement with pin 57 for permitting spring 59 to swing the swivel plate 51 into position to drive the record changing gear 55.

The invention claimed is:

1. In a power transmission, a driving gear, a driven gear, a cam rotatable with said driven gear, a movable mounting for said driving gear, means for supporting said mounting in position to move said driving gear into and out of meshing engagement with said driven gear, a spring connected with said mounting urging it into gear meshing position, a shift lever having latching engagement with said mounting to permit gear meshing movement thereof when unlatched and spring biased to gear disengaging position when latched, a cam follower on said lever engageable with said cam to restrain said lever during a partial revolution thereof, said cam being recessed to receive said follower and permit said lever under its spring tension to jerk said mounting in a direction to disengage said gears, and a spring actuated member in operative engagement with said driven gear to impart an accelerated movement thereto at substantially the instant of disengagement to free the meshing teeth from frictional contact.

2. In a power transmission, a driving gear, a driven gear, a cam rotatable with said driven gear, a movable mounting for said driving gear, means for supporting said mounting in position to move said driving gear into and out of meshing engagement with said driven gear, a spring connected with said mounting for urging said driving gear into meshing engagement with said driven gear, a cam controlled lever operably connected with said movable mounting biased under spring tension in a direction to move said mounting to gear disengaging position, and a follower on said lever positioned to drop into a recess provided in said cam for jerking said mounting in a direction to free said gears under tension of the spring connected with said lever.

3. In a power transmission, a driving gear, a driven gear, a pair of cams rotatable with said driven gear, a movable mounting for said driving gear, means for supporting said mounting in position to move said driving gear into and out of meshing engagement with said driven gear, a spring connected with said mounting urging it into gear engaging position, a cam controlled lever operably connected with said movable mounting biased under spring tension in a direction to move said mounting to gear disengaging position, a follower on said lever positioned to drop into a recess provided in one of said cams for jerking said mounting in a direction to separate said gears under tension of the spring connected with said lever, and a second spring actuated cam lever having a cam follower engageable with the other said cam and urged thereagainst in a direction substantially tangential thereto, said last-mentioned cam being provided with a shouldered recess for receiving the cam supported on said lever in a direction to impart an accelerating movement to said cam and driven gear under spring tension to free the meshing teeth of said gears substantially simultaneously with the movement of said first-mentioned lever in a direction to separate said gears.

4. In a record changer for phonographs of the drop type including a base plate, a support for holding a stack of records above a turntable rotatable above said base plate to be individually released and dropped thereon in playing position, and means operable to effect such release, the combination therewith of a stack resetting mechanism comprising a yoke pivotally mounted on said base plate to extend thereover adjacent each side of said turntable in the plane thereof and below the lowermost record thereon, power means in operating engagement with said yoke to swing it upwardly and downwardly with relation to said turntable about its pivotal mounting, a record engaging arm pivoted intermediate its ends to each of the free ends of said yoke movable by said yoke into engagement with the underside of the lowermost record to raise said record and any record superimposed thereon upwardly from said turntable for resetting on said support, a guide member connected with one of said arms for maintaining said arm and engaged record in parallel relation with said turntable as they are raised therefrom said guide member having a curved track, and a guide bearing on said base plate in sliding engagement with said track.

5. In a record changer for phonographs of the drop type including a base plate, a support for holding a stack of records above a turntable rotatable above said base plate to be individually released and dropped thereon in playing position, and means operable to effect such release, the combination therewith of a stack resetting mechanism comprising a yoke pivotally mounted on said base plate to extend thereover adjacent each side of said turntable in the plane thereof and below the lowermost record thereon, power means in operating engagement with said yoke to swing it upwardly and downwardly with relation to said turntable about its pivotal mounting, a record engaging arm pivoted intermediate its ends to each of the free ends of said yoke, a cushion member secured to each end of said arms movable by said yoke into engagement with the underside of the lowermost record to raise said record and any records superimposed thereon upwardly for resetting on said support, a guide plate connected with one of said arms extending downwardly therefrom into sliding and guiding relation with said base plate for maintaining said arm and engaged record in parallel relation with said turntable as they are raised therefrom said guide member having a curved track, and a guide bearing on said base plate in sliding engagement with said track.

References Cited in the file of this patent

UNITED STATES PATENTS

| Number | Name | Date |
|---|---|---|
| 638,194 | Arnold | Nov. 28, 1889 |
| 1,303,900 | Horn | May 20, 1919 |
| 1,568,130 | Blackwell | Jan. 5, 1926 |
| 1,770,641 | Brennon | July 15, 1930 |
| 1,970,691 | Collison et al. | Aug. 21, 1934 |
| 2,017,898 | Gates | Oct. 22, 1935 |
| 2,058,842 | Thompsett et al. | Oct. 27, 1936 |
| 2,204,241 | Young | June 11, 1940 |
| 2,220,435 | Wright | Nov. 5, 1940 |
| 2,287,098 | Habegger | June 23, 1942 |
| 2,305,808 | Marzetti | Dec. 22, 1942 |
| 2,309,197 | Lewis | Jan. 26, 1943 |
| 2,330,383 | Roe | Sept. 28, 1943 |
| 2,333,414 | De Tar | Nov. 2, 1943 |
| 2,339,154 | Crosman | Jan. 11, 1944 |
| 2,348,924 | Roe | May 16, 1944 |
| 2,546,136 | Ristau et al. | Mar. 20, 1951 |

FOREIGN PATENTS

| Number | Country | Date |
|---|---|---|
| 281,003 | Great Britain | Nov. 23, 1927 |
| 158,601 | Switzerland | Nov. 30, 1932 |